June 4, 1963 H. F. MARTIN ETAL 3,092,823

DECODING DEVICE

Filed April 2, 1958 3 Sheets-Sheet 1

INVENTOR.
HAROLD F. MARTIN
LLOYD C. TIDBALL
WILLIAM A. GODDARD
BY John B. Clark
ATTORNEY

DECODING DEVICE

Filed April 2, 1958 3 Sheets-Sheet 3

United States Patent Office 3,092,823
Patented June 4, 1963

3,092,823
DECODING DEVICE

Harold F. Martin, San Jose, Lloyd C. Tidball, Saratoga, and William A. Goddard, Monte Sereno, Calif., assignors to International Business Machines Corporation, New York, N.Y., a corporation of New York
Filed Apr. 2, 1958, Ser. No. 725,978
7 Claims. (Cl. 340—347)

Figure 1:
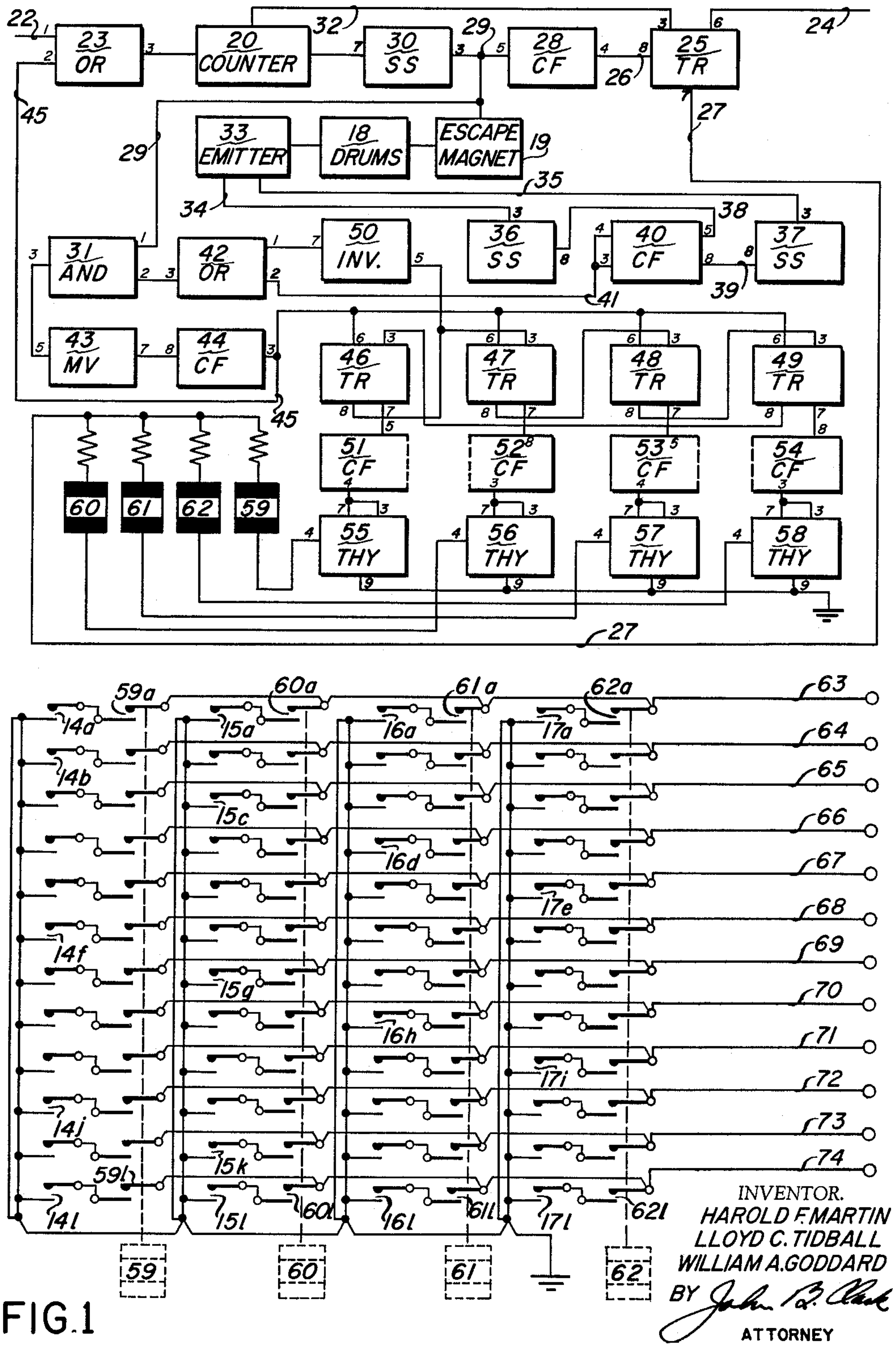

The present invention pertains generally to decoding devices and relates more particularly to a table look-up device for converting information from one form to another.

It is often desired to convert information from one form to another, and in many such cases, such as the conversion of binary coded information to decimal form, convenient decoding matrices are available to effect the conversion. In some instances, however, the conversion may not follow such a well-defined logic as is available in the case of binary-to-decimal conversion and it is necessary to provide a converter mechanism having a table look-up type of operation.

An object of the present invention is to provide an improved decoding device.

Another object is to provide a new table look-up device for converting information from one form to another.

According to the invention, decoding is accomplished by the use of a conversion table containing the decoded information and the table is scanned under control of a register which indicates the original information and which controls selection of the decoded form of the information. In the disclosed embodiment the information table includes a plurality of record cards, each column of each of which is punched according to the converted form of a piece of information to be decoded. The information to be decoded is entered into a counter register and means controlled by the counter register are provided for mechanically scanning, column by column, corresponding columns of the various cards. Prior to the scanning operation, however, the counter is complemented and, when scanning is initiated, signals are entered into the counter until a predetermined condition thereof is detected. A plurality of these signals, equal in number to the number of record cards, are generated while each group of corresponding card columns is being scanned, and means controlled by these signals are provided for selecting the appropriate one of the several columns being scanned when the counter reaches the above mentioned predetermined condition for determining the desired conversion. In this way groups of mechanically positioned card columns containing the converted data are successively positioned for scanning, the selection of the desired group as well as the desired data within that group being determined according to the condition of the counter.

Accordingly, another object is to provide a data conversion device controlled to position successively groups of converted data for scanning and to scan these groups under control of a register for determining the desired converted data according to the register.

Another object is to provide a data conversion device wherein groups of converted data are positioned for scanning successively and the converted data of each group is scanned serially under control of a counter register for determining the desired converted data according to a predetermined condition of the counter register.

Other objects of the invention will be pointed out in the following description and claims and illustrated in the accompanying drawings, which disclose, by way of example, the principle of the invention and the best mode which has been contemplated of applying that principle.

In the drawings:

FIG. 1 depicts the electronic circuitry of the disclosed embodiment of the invention.

Figure 2:
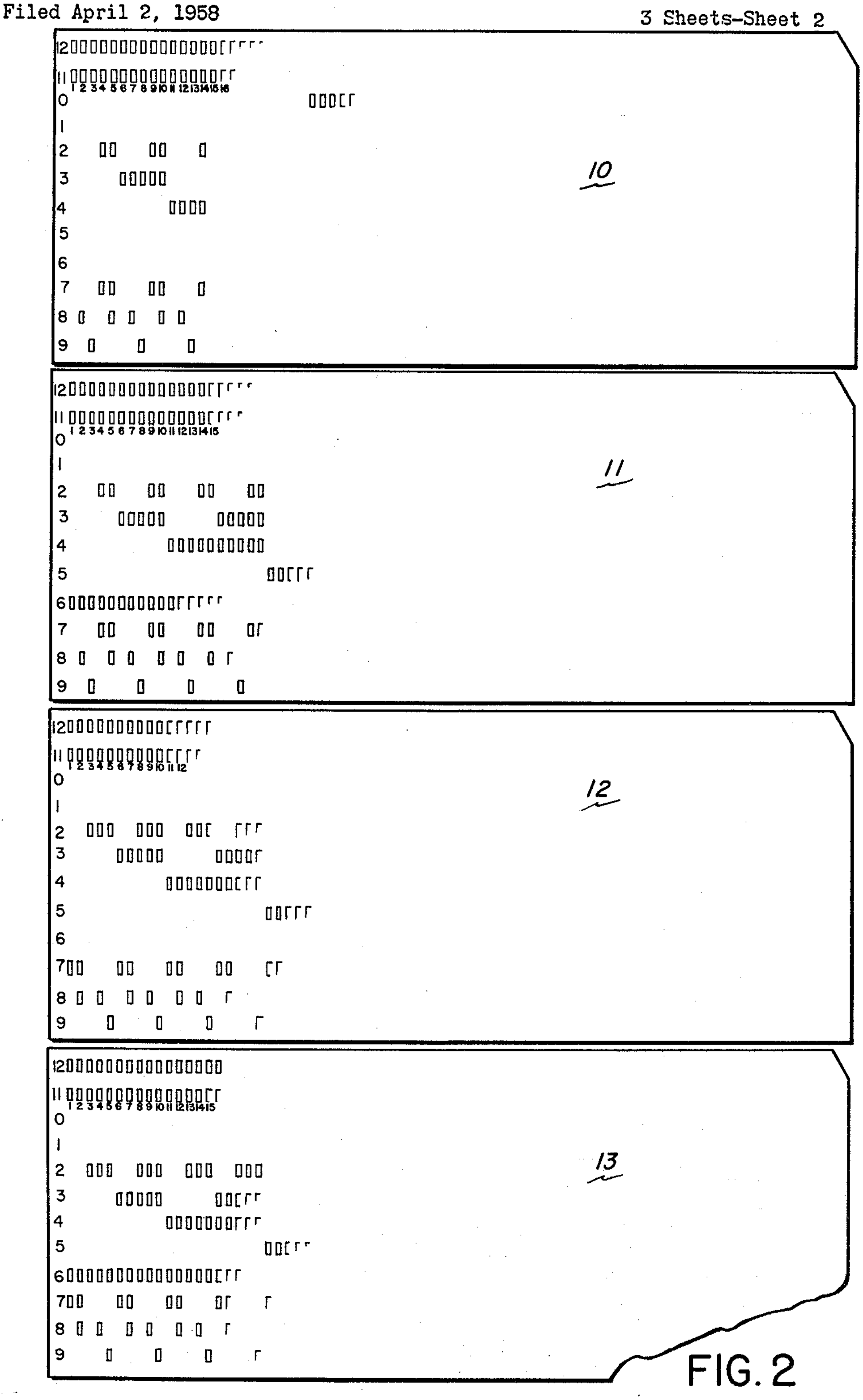
Figures 3, 4, 5, 6, 7, 8, 9, 10:
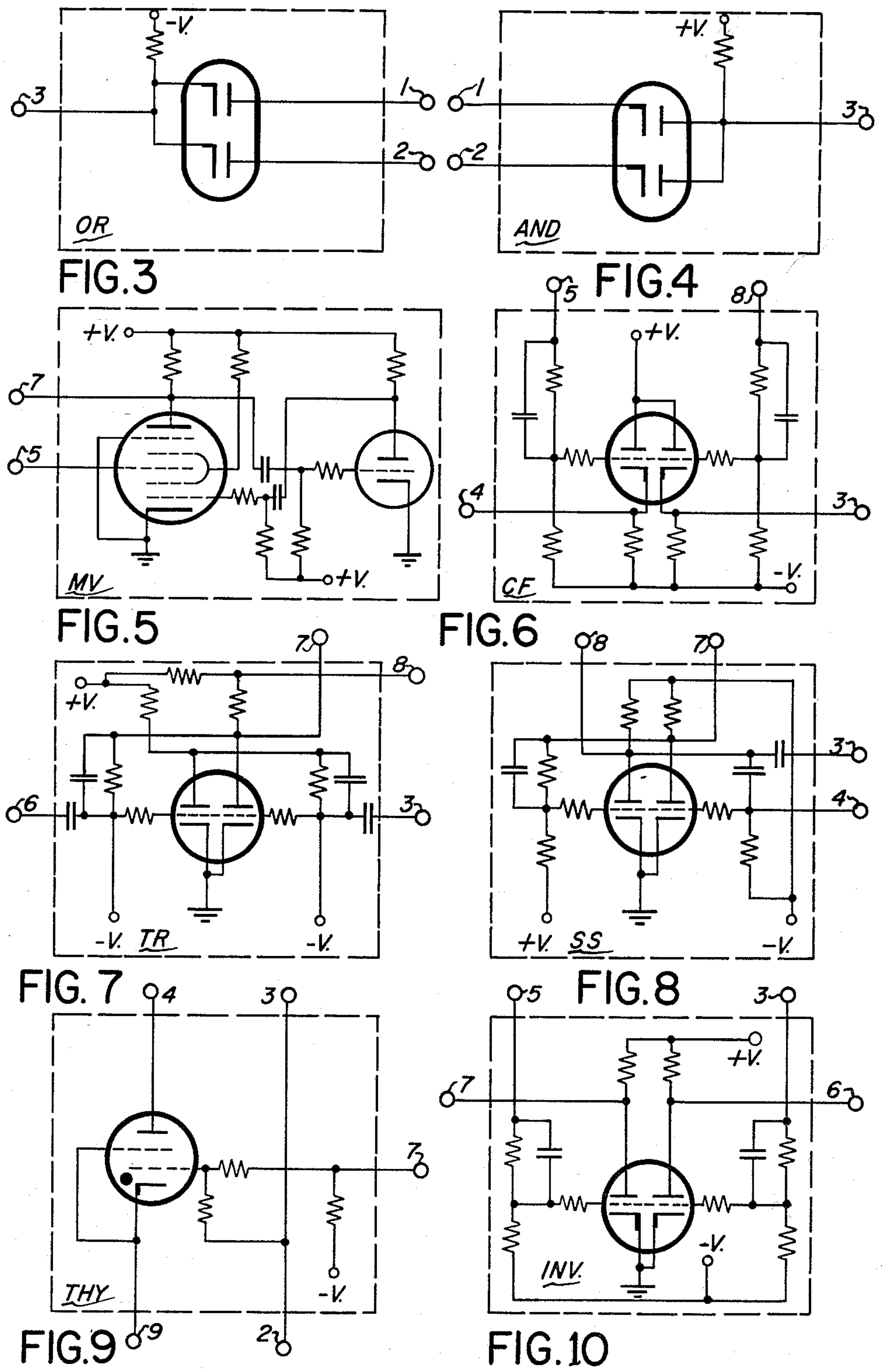

FIG. 2 discloses conversion cards punched according to decoded data which are scanned under control of the circuitry shown in FIG. 1.

FIGS. 3 through 10 disclose schematic diagrams of various circuits indicated in block form in FIG. 1.

As was mentioned above, the converted data may be punched in record cards 10, 11, 12 and 13 (FIG. 2), corresponding columns of which are scanned simultaneously in any convenient manner. In the present embodiment the twelve rows of each card are arranged in three groups, the first of which includes rows 12, 11, 0 and 1 for defining the hundreds order of a three-digit number (the decoded data) in a four-bit binary code. Rows 2, 3, 4 and 5 define the tens order of the number, and rows 6, 7, 8 and 9 define the units order in a similar manner. Thus, assuming that each card contains 80 columns, a total of 320 three-digit numbers may be recorded thereon to permit the conversion of 320 pieces of information.

Corresponding columns of each of the four cards are scanned simultaneously by means of star wheels or the like (not shown) which are arranged to operate contact sets 14, 15, 16 and 17 (FIG. 1) associated therewith when a hole is present in the corresponding row of the column being scanned, as will be more fully described hereinafter. The cards may be mounted on drums 18 (shown only in block form in FIG. 1) which are driven relative to the star wheels for positioning successive columns thereat under control of an escape magnet 19. The drums and associated star wheels may be such as the drum 230 and star wheels 245 disclosed and described in U.S. Patent 2,647,581, the drums being arranged to rotate relative to the star wheels as long as the escape magnet 19 is energized.

The converted data is entered in the cards in a predetermined order according to the form of the information to be decoded. In the simplified embodiment disclosed herein it is desired to decode data stored in a counter register 20, and the various possible conditions of the counter correspond to the data recorded in selected card columns. For example, if the counter contains a "1," and it is assumed that the decoded form of a "1" is 300, the number 300 is recorded in column 1 of card 10. Similarly, if the counter contains a "2" or a "7," and it is assumed that the decoded form of a "2" is 301 and that the decoded form of a "7" is 306, the number 301 is recorded in column 1 of card 11 and the number 306 is recorded in column 2 of card 12, etc. Thus, the circuitry shown in FIG. 1 is arranged to determine a selected column of one of the four cards under control of the counter 20, the selected column containing an indication of the decoded form of the number entered in the counter.

The details of the various electronic components shown in block form in FIG. 1 may be supplied by anyone skilled in the art; however, in order to clarify any possible misunderstanding illustrative circuits, the operations of which is well known, have been shown in FIGS. 3 through 10.

Referring now to FIG. 1, the counter 20 may be of any convenient design and is arranged to accumulate signals entered therein via a line 22 and an OR circuit 23, the output of the OR circuit 23 being connected to the input of the counter 20. It is the condition of the counter after the accumulation of such signals is terminated that is to be converted according to the conversion table provided by the cards 10 through 13. Assuming that accumulation is terminated, conversion is initiated by entering a signal on a line 24 connected to the #6 tap of a trigger 25, which signal is arranged to operate this trigger to raise the potential of a line 26 connected to the #8 tap thereof and to lower the potential of a line 27 connected to the #7 tap thereof.

Since the original condition of the counter 20 is used to control the selection of the appropriate column of one of the cards 10 through 13, it is necessary to determine this condition. In the disclosed embodiment this is accomplished by first complementing the counter and by then entering signals therein until the counter carries. The number of such signals necessary to bring about a carry is indicative of the original condition of the counter. It is these signals that control the selection of the appropriate card column. In this connection it should be noted that the desired result, i.e., the generation of a number of signals corresponding to the original condition of the counter, may be accomplished in any one of several ways and that the disclosed method is not essential to the invention. For example, the counter need not be complemented but could be driven backwards until an "empty" condition is detected. It is only necessary that the condition of the counter control the generation of a number of pulses necessary for the selection of the appropriate card column.

Accordingly, the line 26 connects through a cathode follower 28 to a line 29, which line connects to the input of a single-shot multivibrator 30, to the escape magnet 19 and to the #1 tap of an AND circuit 31. The #7 tap of the single-shot 30 connects to the counter 20 for controlling the counter to be complemented when the line 29 rises in potential. Thus, the counter 20 is complemented when conversion is initiated. Additionally, the escape magnet 19 is energized for controlling the drums 18 to permit the cards 10 through 13 to pass under the star wheels as long as the potential of the line 29 is high. Signals from a source to be described are entered into the counter 20 until a carry signal from the high order of the counter is generated and is entered on a line 32, which line connects to the #3 tap of the trigger 25 for reversing its condition of stability. Thus, when a number of signals equal to the number originally stored in the counter 20 have been entered therein, the trigger 25 is operated for preventing further escapement of the cards 10 through 13 since at this time the #8 tap of the trigger 25 drops in potential.

The signals entered into the counter during conversion are generated under the control of an emitter 33. The emitter 33 is arranged to enter a signal on one of two lines 34 or 35 each time cards 10 through 13 are moved to position the next columns thereof at the star wheels, signals corresponding to successive card columns being entered on alternate lines 34 or 35. Thus, signals are entered on the line 34 when odd numbered columns are positioned at the star wheels, the signals being entered on the line 35 when even numbered columns are so positioned. The lines 34 and 35 connect to two single-shot multivibrators 36 and 37, respectively, for operating these units when a signal is entered via the emitter 33 on the corresponding line 34 or 35. The outputs of the single-shots 36 and 37 connect via lines 38 and 39, respectively, to the #5 and #8 taps of a dual cathode follower 40.

A line 41 connects the #3 and #4 taps of the cathode follower 40 to the #2 tap of an OR unit 42, the output of which connects to the #2 tap of the AND unit 31. The output of the AND unit 31 connects to a multivibrator 43 which is controlled to generate pulses in any conventional manner as long as the potential of the #3 tap of the unit 31 is high, i.e., as long as the potential of both the #1 and #2 taps of the unit 31 are high. The multivibrator 43 connects through a cathode follower unit 44 to a line 45, which line connects to the #2 tap of the OR unit 23 for entering the multivibrator pulses into the counter 20. The line 45 additionally connects to the #6 tap of each of four triggers 46, 47, 48 and 49 which are connected in a conventional manner as a four-stage ring counter.

Prior to the conversion operation the ring is reset in any convenient manner in such a way that the potential of the #7 and #8 taps of the trigger 46 are initially high, the potential of the #7 and #8 taps of the triggers 47, 48 and 49 being initially low. In addition to connecting to the #3 tap of the trigger 47, the #8 tap of the trigger 46 connects through an inverter 50 to the #1 tap of the OR unit 42, as was mentioned above, the multivibrator 43 operates only as long as the potential of the #5 tap thereof is high. It will be recalled that the potential of the line 41, connected through the OR unit 42 to the AND unit 31, is high only for the duration of the pulse generated by one or the other of the single-shot multivibrators 36 or 37. This signal is of short duration, and it is for this reason that the #8 tap of the trigger 46 connects through the inverter 50 to the OR unit 42. When a pulse taken from one of the single-shots 36 or 37 is entered onto the line 41, therefore, the multivibrator 43 is rendered operative and the pulses generated thereby drive the ring. The first such pulse operates the trigger 46 and causes the #8 tap thereof to drop in potential, thereby raising the potential of the #1 tap of the OR unit 42 for permitting continued operation of the multivibrator 43 after the extinction of the single-shot signal and as long as the potential of the #8 tap of the trigger 46 is high. The ring is a four-stage ring and it should be clear, therefore, that the #8 tap of the trigger 46 will not rise in potential until four pulses have been entered onto the line 45, and it is at this time that the #5 tap of the multivibrator 43 again drops in potential, thereby preventing generation of further pulses until another single-shot signal is entered onto the line 41. Thus, each time new card columns are positioned at the star wheels four signals are generated by the multivibrator for entry into the counter 20. This is true as long as the potential of the line 29 is high.

The #7 tap of each of the triggers 46 through 49 connects to a corresponding cathode follower 51 through 54, respectively, the outputs of these cathode followers being connected to the corresponding inputs of four thyratrons 55 through 58, respectively. Connected to the plate of each thyratron 55 through 58 is one side of a corresponding relay 59 through 62, the other sides of these relays being connected in common to the line 27. It will be recalled that the line 27 connects to the trigger 25 and is arranged to rise in potential when a carry is taken from the counter 20 via the line 32. Thus, when a number of pulses corresponding to the initial condition of the counter have been entered therein, the trigger 25 is operated, thereby raising the potential of the line 27 for permitting energization of one of the relays 59 through 62 according to the condition of the ring comprising triggers 46 through 49 at that time.

The relays 59 through 62 are utilized for selecting the proper one of the four card columns of the cards 10 through 13 being scanned, at the time the counter 20 carries, i.e., they control the selection of the appropriate decoded signals. Thus, four pulses are generated each time a new column is positioned at the star wheels for driving the ring as well as for entry into the counter. When the counter carries, i.e., when a number of pulses equal to the original condition of the counter have been entered therein, further operation of the multivibrator is prevented and one of the relays 59 through 62 is energized for selecting the appropriate card column then being scanned according to the number of pulses entered in the counter.

The contact sets 14 through 17 operated by the various star wheels associated with the drums are shown connected between ground and a corresponding line 63 through 74 through one side of a corresponding normally open contact of the associated one of the four relays 59 through 62. For example, one side of the contact 14*a* connects to ground, the other side thereof being arranged to connect through the normally open *a* contacts of the relay 59 to the line 63. In a similar manner, the various contacts 15, 16 and 17 connect through corresponding points of the relays 60, 61 and 62 to the various lines 63 through 74. Thus, the relays 59 through 62 determine which of the contacts 14, 15, 16 or 17 connect to the lines 63 through 74. As will become clear, the decoded output signals are taken from the lines 63 through 74.

To describe the operation of the invention, let it be assumed that fifteen signals have been entered via the line 22 and OR circuit 23 into the counter 20 and that it is desired to decode the contents of the counter, i.e., to decode 15, according to the information punched in the appropriate column of one of the cards 10 through 13 (FIG. 2). Conversion is initiated by signaling the line 24 (FIG. 1) for operating the trigger 25 which causes the counter to be complemented. In addition, the escape magnet 19 is energized, causing the cards 10 through 13 to be moved column by column relative to the star wheels to position the first columns and successive columns thereof at these star wheels. As each new column is positioned at the star wheels, the emitter 33 controls the multivibrator 43 to enter four pulses into the counter via the line 45. These pulses also drive the ring comprising triggers 46 through 49. When 15 such pulses have been entered into the counter 20, the counter carries, thereby reversing the condition of the trigger 25 to de-energize the escape magnet for preventing further movement of the cards 10 through 13 relative to the star wheels and also to prevent the generation of additional pulses by the multivibrator 43. Additionally, when the trigger 25 is operated, the potential of the line 27 goes up, thereby connecting the operating potential to one side of each of the four relays 59 through 62.

Only one of the triggers 46 through 49 may be in a condition for operating its corresponding thyratron 55 through 58 according to the number of pulses entered into the counter prior to the carry. In the present example, 15 pulses entered onto the line 45 control the counter to carry, at which time the #7 tap of the trigger 49 is high in potential. The #7 taps of the triggers 46, 47 and 48 are low in potential at this time. Thus, when the trigger 25 is operated to raise the potential of the line 27, the thyratron 58 conducts, thereby picking relay 62. When relay 62 operates, its various contacts are closed, thereby connecting one side of each of the star wheel contacts 17 to the corresponding line 63 through 74. The contacts 17 cooperate with the card 13 (FIG. 2) and are operated by the corresponding star wheels according to the punches shown in column 4 of this card since the escape magnet was energized until column 4 of each of the cards was positioned at the star wheels. Referring to FIG. 2, it will be seen that the output lines connected to ground via contacts 17 (FIG. 1) include the lines 63, 64, 67, 71 and 73 for indicating that the decoded form of the data is 315. Thus, the result stored in the counter 20 is decoded according to the conversion table defined by cards 10 through 13 and signals are entered onto the appropriate output lines 63 through 74 defined by the table.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A decoding device comprising means for storing information to be decoded, a conversion table including a plurality of cards punched according to the decoded form of information, each column of each said card corresponding to different information, means responsive to a first signal for scanning said cards column by column, corresponding columns of said cards being scanned simultaneously, means for generating pulses equal in number to the number of said cards each time a column of said cards is being scanned, means for generating a second signal when a number of pulses corresponding to said information to be decoded have been generated, and means controlled by the number of said pulses generated when said second signal is generated for controlling the selection of a column of the several said card columns being scanned at that time, said selected column denoting indicia of the decoded form of the information to be decoded.

2. A device for decoding information comprising a conversion table including a plurality of record cards each of which contains indicia of decoded information in selected columns thereof, sensing means associated with each said card for developing signals corresponding to sensed indicia, said sensing means being arranged to sense indicia in corresponding columns of said cards simultaneously, scan control means for sequentially positioning successive columns of said cards at said sensing means, pulse counting means, means for entering a sequence of pulses equal in number to the number of said cards into said counting means each time new card columns are positioned at said sensing means, means for generating a signal when the condition of said counting means corresponds to information to be decoded, said pulse entering means and said scan control means being rendered inoperative in response to said signal, an output circuit, and means responsive to said signal for connecting one of said sensing means to said output circuit according to the number of pulses entered in said counting means during the last sequence of said pulses.

3. A decoding device comprising a first counter settable according to information to be decoded, a conversion table including a plurality of record cards, selected columns in each said card containing indicia of decoded information, sensing means cooperating with each said card for sensing indicia in columns subjected thereto, scanning means for subjecting successive columns of said cards to the corresponding sensing means, means for entering signals in said first counter, said means being arranged to enter a sequence of signals equal in number to the number of said cards each time new columns of said cards are subjected to said sensing means, said first counter being arranged to generate a control signal when the number of signals entered therein corresponds to said information to be decoded, a second counter for indicating the number of signals entered in said first counter during each sequence of said signals, means responsive to said control signal from said counter for preventing the entry of additional signals therein and for rendering said scanning means inoperative, an output circuit, and means responsive to the condition of said second counter upon the occurrence of said control signal for connecting a corresponding one of said sensing means to said output circuit, whereby signals representative of indicia of a selected column of one of said cards are entered in said output circuit according to the condition of said first counter.

4. A device for decoding information comprising a conversion table including a plurality of record cards, selected columns in each said card containing indicia of decoded information, sensing means cooperating with each said card for sensing indicia in card columns subjected thereto, scanning means for successively subjecting corresponding columns of said cards to said sensing means, pulse generating means normally operative to generate a sequence of pulses corresponding in number to the number of said cards each time new columns of said cards are subjected to said sensing means, means for rendering said pulse generating means inoperative to generate any further pulses in a given sequence when the total number of generated pulses corresponds to the information to be decoded, an output circuit, and means under control of the number of pulses generated during said given sequence for connecting a selected one of the several sensing means to said output circuit.

5. A decoding device comprising a register settable in an initial condition according to information to be decoded, a conversion table including a plurality of record cards, selected columns in each said card containing indicia of decoded information, sensing means cooperating with each said card for sensing indicia in card columns subjected thereto, scanning means for successively subjecting corresponding columns of said cards to said sensing means, counting means having a scale corresponding to the number of said cards, means for generating a sequence of pulses corresponding in number to the number of said cards each time new columns of said cards are subjected to said sensing means, means for generating a control signal when the total number of generated pulses corresponds to the initial condition of said register, means for entering said generated pulses in said counting means until said control signal is generated, an output circuit, and means controlled by the condition of said counting means when said control signal is generated to selectively connect one of said sensing means to said output circuit.

6. A decoding device comprising a register settable in an initial condition according to information to be decoded, a conversion table including a plurality of record cards, selected columns in each said card containing indicia of decoded information, sensing means cooperating with each said card for sensing indicia in card columns subjected thereto, scanning means for successively subjecting corresponding columns of said cards to said sensing means, counting means having a scale corresponding to the number of said cards, means for entering a sequence of pulses corresponding in number to the number of said cards in said counting means each time new columns of said cards are subjected to said sensing means, said means being operative to prevent the entry of additional pulses in said counting means and to render said scanning means inoperative when the total number of entered pulses corresponds to the initial condition of said register, an output circuit, and means for connecting one of the sensing means to said output circuit according to the condition of said counting means.

7. A decoding device comprising a first counter settable according to information to be decoded, a conversion table including a plurality of record cards, selected columns in each said card containing indicia of decoded information, sensing means cooperating with each said card for sensing indicia in card columns subjected thereto, scan control means responsive to a first signal for successively subjecting corresponding columns of said cards to said sensing means for the duration of said first signal, means for initiating said first signal when a decode operation is started, a pulse generator, means for entering generated pulses taken from said generator in said first counter, means controlled by said first signal for controlling said pulse generator to generate a sequence of pulses equal in number to the number of said cards each time new card columns are subjected to said sensing means, said pulse generator being rendered inoperative to generate further pulses when said first signal terminates, means for terminating said first signal and for generating a second signal when a number of pulses corresponding to the information to be decoded have been entered in said first counter, a second counter for counting the number of pulses generated during each sequence of pulses, an output circuit, and means under control of said second signal for connecting one of said sensing means to said output circuit according to the condition of said second counter when said second signal occurs, whereby indicia of the decoded information corresponding to the information to be decoded are entered from the appropriate card column into the output circuit under control of the information to be decoded.

References Cited in the file of this patent

UNITED STATES PATENTS

| | | |
|---|---|---|
| 2,528,161 | Miloche | Oct. 31, 1951 |
| 2,580,768 | Hamilton | Jan. 1, 1952 |
| 2,686,299 | Eckert | Aug. 10, 1954 |
| 2,706,079 | Connolly | Apr. 12, 1955 |
| 2,957,162 | Hunt | Oct. 18, 1960 |